United States Patent
Zhang et al.

(10) Patent No.: US 10,202,542 B2
(45) Date of Patent: Feb. 12, 2019

(54) AQUEOUS SLURRY FOR PARTICULATES TRANSPORTATION

(71) Applicant: TRICAN WELL SERVICE LTD., Calgary (CA)

(72) Inventors: Kewei Zhang, Calgary (CA); Julius Xaver Heidlas, Humble, TX (US); Chuanzhong Wang, Calgary (CA); Weibing Lu, Calgary (CA)

( * ) Notice: Subject to any disclaimer, the term of this patent is extended or adjusted under 35 U.S.C. 154(b) by 7 days.

(21) Appl. No.: 15/361,156

(22) Filed: Nov. 25, 2016

(65) Prior Publication Data

US 2017/0107424 A1    Apr. 20, 2017

Related U.S. Application Data

(62) Division of application No. 14/801,619, filed on Jul. 16, 2015.

(51) Int. Cl.
| | |
|---|---|
| C09K 8/80 | (2006.01) |
| C09K 8/92 | (2006.01) |
| E21B 43/16 | (2006.01) |
| E21B 43/26 | (2006.01) |
| E21B 43/267 | (2006.01) |
| C09K 8/68 | (2006.01) |
| C09K 8/88 | (2006.01) |

(52) U.S. Cl.
CPC ............... *C09K 8/805* (2013.01); *C09K 8/68* (2013.01); *C09K 8/80* (2013.01); *C09K 8/88* (2013.01); *C09K 8/92* (2013.01); *E21B 43/164* (2013.01); *E21B 43/168* (2013.01); *E21B 43/26* (2013.01); *E21B 43/267* (2013.01)

(58) Field of Classification Search
None
See application file for complete search history.

(56) References Cited

U.S. PATENT DOCUMENTS

| | | |
|---|---|---|
| 2,331,594 A | 10/1943 | Blair, Jr. |
| 2,419,755 A | 4/1947 | Albaugh |
| 2,765,851 A | 10/1956 | Bond |
| 2,885,078 A | 5/1959 | Fenske |
| 2,935,475 A | 5/1960 | Bernard |
| 3,060,210 A | 10/1962 | De Groote et al. |
| 3,179,250 A | 4/1965 | Bunge et al. |
| 3,271,307 A | 9/1966 | Dickson et al. |
| 3,361,213 A | 1/1968 | Savins |
| 3,373,107 A | 3/1968 | Rice et al. |
| 3,505,374 A | 4/1970 | Monroe |
| 3,595,390 A | 7/1971 | Booth |
| 3,696,923 A | 10/1972 | Miller |
| 3,757,864 A | 9/1973 | Crawford et al. |
| 3,857,444 A | 12/1974 | Copeland |
| 3,864,137 A | 2/1975 | Van Bonin et al. |
| 3,868,318 A | 2/1975 | Clark et al. |
| 3,945,435 A | 3/1976 | Barry |
| 3,980,136 A | 9/1976 | Plummer et al. |
| 3,990,978 A | 11/1976 | Hill |
| 4,000,781 A | 1/1977 | Knapp |
| 4,003,393 A | 1/1977 | Jaggard et al. |
| 4,007,128 A | 2/1977 | Poklacki |
| 4,042,031 A | 8/1977 | Knapp |
| 4,046,795 A | 9/1977 | Martin |
| 4,054,161 A | 10/1977 | Alack |
| 4,061,580 A | 12/1977 | Jahnke |
| 4,143,716 A * | 3/1979 | Kalfoglou ............... C09K 8/584 166/270.1 |
| 4,183,814 A | 1/1980 | Ramachandran |
| 4,231,428 A | 11/1980 | Needham et al. |
| 4,301,868 A | 11/1981 | Scherubel et al. |
| 4,316,810 A | 2/1982 | Burnham |
| 4,368,136 A | 1/1983 | Murphey |
| 4,454,056 A | 6/1984 | Kittelmann et al. |
| 4,512,405 A | 4/1985 | Sweatman et al. |
| 4,537,595 A | 8/1985 | Gruning et al. |
| 4,564,456 A | 1/1986 | Homan |
| 4,585,064 A | 4/1986 | Graham et al. |
| 4,654,161 A | 3/1987 | Kollmeier et al. |
| 4,689,085 A | 8/1987 | Plueddemann |
| 4,725,351 A | 2/1988 | Mehrotra |
| 4,780,220 A | 10/1988 | Peterson |
| 4,832,702 A | 5/1989 | Kummer et al. |

(Continued)

FOREIGN PATENT DOCUMENTS

| | | |
|---|---|---|
| CA | 1071076 | 2/1980 |
| CA | 1104804 | 7/1981 |

(Continued)

OTHER PUBLICATIONS

International Search Report and Written Opinion (PCT/CA2006/000705); dated Aug. 25, 2006.
International Search Report and Written Opinion (PCT/CA2006/001567); dated Jan. 3, 2007.
International Search Report and Written Opinion (PCT/CA2008/000786); dated Aug. 18, 2008.
International Search Report and Written Opinion (PCT/CA2008/001293); dated Nov. 10, 2008.

(Continued)

*Primary Examiner* — Jeffrey D Washville
(74) *Attorney, Agent, or Firm* — Parlee McLaws LLP; Susan Rancourt; Sean Goodwin

(57) ABSTRACT

An aqueous slurry composition for use in industries such as petroleum and pipeline industries comprises an aqueous liquid, particulates, a hydrophobizing agent that renders the particulate surface hydrophobic and a hydrophobic polymer. The slurry is produced by rendering the surface of the particulate hydrophobic during or prior to making the slurry. The method and composition can find many applications in different industries, particularly in petroleum industry.

41 Claims, No Drawings

(56) References Cited

U.S. PATENT DOCUMENTS

| | | |
|---|---|---|
| 4,857,221 A | 8/1989 | Brookes et al. |
| 4,891,166 A | 1/1990 | Schaefer et al. |
| 4,898,957 A | 2/1990 | Pleuddemann et al. |
| 4,933,327 A | 6/1990 | Plueddemann et al. |
| 4,960,845 A | 10/1990 | O'Lenick, Jr. |
| 4,964,465 A | 10/1990 | Surles |
| 5,098,979 A | 3/1992 | O'Lenick, Jr. |
| 5,110,485 A | 5/1992 | Huddleston |
| 5,149,765 A | 9/1992 | O'Lenick, Jr. |
| 5,166,297 A | 11/1992 | O'Lenick, Jr. |
| 5,209,775 A | 5/1993 | Bank et al. |
| 5,235,082 A | 8/1993 | Hill et al. |
| 5,240,760 A | 8/1993 | George et al. |
| 5,256,805 A | 10/1993 | O'Lenick, Jr. |
| 5,292,908 A | 3/1994 | Onikata et al. |
| 5,306,434 A | 4/1994 | Schuller et al. |
| 5,332,791 A | 7/1994 | Knoll et al. |
| 5,359,104 A | 10/1994 | Higgs et al. |
| 5,474,835 A | 12/1995 | McCarthy et al. |
| 5,616,758 A | 4/1997 | McCarthy et al. |
| 5,643,672 A | 7/1997 | Marchi et al. |
| 5,646,215 A | 7/1997 | Lee |
| 5,653,794 A | 8/1997 | Weber et al. |
| 5,693,837 A | 12/1997 | Smith et al. |
| 5,798,144 A | 8/1998 | Varanasi et al. |
| 5,824,226 A | 10/1998 | Boyd et al. |
| 5,858,928 A | 1/1999 | Aubert et al. |
| 6,047,772 A | 4/2000 | Weaver et al. |
| 6,060,521 A | 5/2000 | Sekutowski et al. |
| 6,132,638 A | 10/2000 | Oldenhove |
| 6,187,720 B1 | 2/2001 | Acker et al. |
| 6,277,361 B1 | 8/2001 | Murray |
| 6,297,210 B1 | 10/2001 | Hsu et al. |
| 6,323,268 B1 | 11/2001 | Fisher et al. |
| 6,403,163 B1 | 6/2002 | Fisher et al. |
| 6,482,969 B1 | 11/2002 | Helmrick et al. |
| 6,524,597 B2 | 2/2003 | Kashimoto |
| 6,586,497 B2 | 7/2003 | Gay et al. |
| 6,649,571 B1 | 11/2003 | Morgan |
| 6,696,052 B2 | 2/2004 | Aeby et al. |
| 6,729,409 B1 | 5/2004 | Gupta et al. |
| 6,736,891 B1 | 5/2004 | Bice et al. |
| 6,830,811 B2 | 12/2004 | Chao |
| 7,066,258 B2 | 6/2006 | Justus et al. |
| 7,135,231 B1 | 11/2006 | Sinclair et al. |
| 7,388,033 B2 | 6/2008 | Nagy et al. |
| 7,581,590 B2 | 9/2009 | Lesko et al. |
| 7,723,274 B2 | 5/2010 | Zhang |
| 7,977,285 B2 | 7/2011 | Zhang et al. |
| 8,105,986 B2 | 1/2012 | Zhang |
| 8,236,738 B2 | 8/2012 | Zhang |
| 8,499,835 B2 | 8/2013 | Zhang et al. |
| 2003/0102128 A1 | 6/2003 | Dawson et al. |
| 2003/0146134 A1 | 8/2003 | Yoon |
| 2003/0217953 A1 | 11/2003 | Xu et al. |
| 2004/0023818 A1 | 2/2004 | Nguyen et al. |
| 2004/0082055 A1 | 4/2004 | Hince et al. |
| 2005/0092489 A1 | 5/2005 | Welton et al. |
| 2005/0187112 A1 | 8/2005 | Goodhue, Jr. et al. |
| 2005/0194142 A1 | 9/2005 | Nguyen et al. |
| 2005/0244641 A1* | 11/2005 | Vincent .............. C09K 8/62 428/403 |
| 2005/0252658 A1 | 11/2005 | Willingham et al. |
| 2006/0260810 A1 | 11/2006 | Weaver et al. |
| 2007/0015669 A1* | 1/2007 | Zhang .............. C09K 8/18 507/200 |
| 2007/0129257 A1 | 6/2007 | Kippie et al. |
| 2007/0144736 A1 | 6/2007 | Shinbach et al. |
| 2007/0197402 A1 | 8/2007 | O'neil et al. |
| 2008/0173451 A1 | 7/2008 | Reddy et al. |
| 2010/0029515 A1 | 2/2010 | O'Neil et al. |
| 2010/0197526 A1 | 8/2010 | Zhang |
| 2010/0256024 A1 | 10/2010 | Zhang |
| 2010/0267593 A1 | 10/2010 | Zhang |
| 2011/0011589 A1 | 1/2011 | Zhang et al. |
| 2012/0071371 A1 | 3/2012 | Zhang |
| 2012/0073171 A1 | 3/2012 | Boltz et al. |
| 2012/0181019 A1 | 7/2012 | Saini et al. |
| 2012/0245276 A1 | 9/2012 | Hagadorn et al. |
| 2012/0267105 A1* | 10/2012 | Zhang .............. C09K 8/575 166/280.1 |
| 2012/0267112 A1 | 10/2012 | Zhang et al. |
| 2012/0322697 A1 | 12/2012 | Zhang |
| 2014/0131041 A1* | 5/2014 | Liang .............. C09K 8/805 166/280.2 |
| 2014/0243245 A1 | 8/2014 | Zhang |
| 2015/0252254 A1 | 9/2015 | Zhang et al. |
| 2015/0307772 A1 | 10/2015 | Zhang et al. |
| 2016/0017213 A1 | 1/2016 | Zhang et al. |

FOREIGN PATENT DOCUMENTS

| | | |
|---|---|---|
| CA | 1250856 | 3/1989 |
| CA | 2009732 | 8/1990 |
| CA | 2213168 | 2/1998 |
| CA | 2408052 | 11/2001 |
| CA | 2329600 | 6/2002 |
| CA | 2423031 | 10/2003 |
| CA | 2509115 | 12/2005 |
| CA | 2545563 | 11/2006 |
| CA | 2531982 | 7/2007 |
| CA | 2683516 | 10/2008 |
| CA | 2684966 | 11/2008 |
| CA | 2848264 | 11/2008 |
| CA | 2693427 | 1/2009 |
| CA | 2708144 | 6/2009 |
| CA | 2547150 | 1/2010 |
| CA | 2643251 | 5/2010 |
| CA | 2690768 | 7/2011 |
| CA | 2787132 | 7/2011 |
| CA | 2735428 | 9/2011 |
| EP | 0113310 | 7/1984 |
| EP | 0266043 | 5/1988 |
| GB | 1584831 | 2/1981 |
| GB | 2387191 | 10/2003 |
| JP | 58-146434 | 9/1983 |
| SU | 1126590 | 11/1984 |
| WO | 02/22759 | 3/2002 |
| WO | 03/018508 | 3/2003 |
| WO | 2005/100007 | 10/2005 |
| WO | 2005/124099 | 12/2005 |
| WO | 2006/116868 | 11/2006 |
| WO | 2007/033489 | 3/2007 |
| WO | 2007/145734 | 12/2007 |
| WO | 2008/124919 | 10/2008 |
| WO | 2008/131540 | 11/2008 |

OTHER PUBLICATIONS

International Search Report and Written Opinion (PCT/CA2011/000065); dated Apr. 11, 2011.
Extended European Search Report (EP 08748188.3); dated Mar. 8, 2011.
Extended European Search Report (EP 11734286.5); dated May 31, 2013.
"Spheriglass Solid Glass Microspheres," Potters Industries LLC, retrieved from the Internet: http://www.pottersbeads.com/egm/NorthAmerica/Products/SolidGlassMicrospheres/SPHERIGLASS/SPHERIGLASSAGlass.aspx, 2016.

* cited by examiner

AQUEOUS SLURRY FOR PARTICULATES TRANSPORTATION

FIELD

This disclosure relates to an aqueous slurry composition for transporting particulates and to a method of making such a composition.

BACKGROUND

Aqueous slurries, which basically comprise an aqueous medium and particulates, are commonly used in the oil and gas industry to transport particulates through a pipe or tube, either on ground, or from the surface to a subterranean formation or from a subterranean formation to the surface. The most commonly used particulates include sand, ceramic particulates, glass spheres, bauxite (aluminum oxide) particulates, resin coated particulates and synthetic particulates. The particulates usually range in size from about 10 to about 100 U.S. mesh, i.e., about 150 to 2000 μm in diameter and normally have significantly higher density than water. For example, the density of sand is typically about 2.6 $g/cm^3$ while the density of water is 1 $g/cm^3$. Aqueous slurries are widely used in petroleum industry, which include hydraulic fracturing and drilling operations. To make a relatively stable slurry, the particulates must be suspended in a liquid medium for a lengthy period of time at static and/or dynamic conditions, and therefore the viscosity or viscoelasticity of the fluid must be sufficiently high in order to be able to suspend particulates. The most commonly used method for increasing viscosity or viscoelasticity of an aqueous liquid is by adding a viscosifier (for example, a natural or synthetic polymer) or a viscoelastic surfactant to the liquid.

Hydraulic fracturing is a technology commonly used in the petroleum industry to enhance oil and gas production from a subterranean formation. During the operation, a fracturing fluid is injected through a wellbore into a subterranean formation at a pressure sufficient to initiate fractures in the formation. Frequently, the fracturing fluid comprises particulates, commonly known as proppants, suspended in the fluid and transported as a slurry into the fractures. For example, following the initiation of the fractures the slurry transports the particulates into the fractures. At the last stage of the fracturing operation, fracturing fluid is flowed back to the surface leaving proppants in the fractures forming proppant packs to prevent fractures from closing after pressure is released (i.e., the particulates "prop" open the fractures). The proppant packs provide highly conductive channels that allow the hydrocarbons (e.g., oil and/or gas) to seep through the formation to the wellbore more efficiently. Proppants, including sands, ceramic particulates, bauxite particulates, glass spheres, resin coated sands, synthetic particulates and the like, are known in the industry. Among them sands are by far the most commonly used proppants. As noted above, the proppants normally range in size from about 10 to 100 U.S. mesh, which is about 150 to 2000 μm in diameter.

Fracturing fluids in common use include various aqueous-based and non-aqueous based (i.e., hydrocarbon-based) fluids. Due to their low cost and high versatility, aqueous-based fluids are preferred and most commonly used. To better transport particulates, water-soluble viscosifiers, such as polymers (i.e., linear or cross-linked polymers) or viscoelastic surfactants are added to increase fluid viscosity. For example, a polymer, such as guar gum or its derivatives, is added into an aqueous liquid wherein the physical entanglement of polymer chains increases the fluid viscosity and thus its suspension capability. To further enhance fluid viscosity, it is common to chemically cross-link polymer chains by certain chemical compounds forming chemically cross-linked gel. Guar gum cross-linked by borates is one example of this. Compared to a cross-linked fluid, linear gels, i.e., fluids containing sufficient amount of polymers without cross-linking, cause less formation damage and are more cost-effective, but have relatively poor suspension capability. In recent years, slick water, i.e., water containing very small amount of friction reducing agent, which normally ranges from 0.015% to 0.1%, preferably 0.02% to 0.06%, of the fluid, has been widely used as a fracturing fluid, especially for fracturing shale or tight formations. Various water-soluble polymers, including guar gum and its derivatives as well as polyacrylamide and its derivatives, have been used as friction reducing agents. Polyacrylamide copolymers, which contain other monomers in addition to acrylamide monomers, are commonly used as friction reducing agents in hydraulic fracturing operations. One such type of copolymer is a hydrophobically modified polyacrylamide copolymer.

Viscoelastic fluids are the fluids that exhibit both viscous and elastic characteristics when being subjected to stress and are widely used to make aqueous slurries to transport particulates. Basically, the viscosity of the fluid works to slow down the rate of particulate settling out of suspension, while the elasticity helps to suspend the particulates. Under dynamic conditions, agitation or turbulence further help stabilize the slurry. Therefore, conventional methods of making stable particulate slurries focus on manipulating the rheological properties of the fluid by adding sufficient amounts of a viscosifier, such as a water-soluble polymer, to the slurry. It is not unusual that a polymer is used together with a foaming agent to improve the rheology and reduce the cost.

As noted above, the last stage of a fracturing treatment involves the flowing of the fracturing fluid back to the surface while the proppants are left in the fractures. However, it is not unusual for a significant amount of proppant to be carried out of the fractures and into the wellbore along with the fluids being flowed back out of the well. This process is known as "proppant flowback". Proppant flowback after fracturing treatments has long plagued the petroleum industry. It is highly undesirable because it not only reduces the amount of proppants remaining in the fractures (thus, leading to reduced fracture conductivity), but also causes significant operational difficulties. U.S. Pat. No. 6,047,772 indicates that different methods have been tried to address the problem of proppant flowback. In one method, resins are used to coat the proppant grains to make them tacky so that they stick together to reduce proppant flowback. This method is expensive, and operationally challenging.

There still exists a need for compositions and methods of making slurries that will form a stable proppant pack in the fracture formations and resist flowing back to the surface, while at the same time being cost-effective and operationally simple.

When drilling subterranean formations for oil and gas, aqueous-based drilling fluids are normally used. During the drilling process large amounts of particulates, called cuttings, are generated. Cuttings have different sizes ranging from fines to pebbles. The drilling fluid is circulated through the wellbore to make a slurry with the cuttings in situ and subsequently transport them out of wellbore. In most cases, polymers as well as clays are added to the drilling fluids to increase their viscosity/viscoelasticity in order to transport the cuttings efficiently. However, polymers and clay fines can easily penetrate into pores or thin fractures in the formation and significantly reduce formation permeability, especially at near wellbore. Reduced formation permeability impedes oil and/or gas production. Therefore it is highly desirable to have a drilling fluid that can make stable slurry in situ with the cuttings and transport them out of the wellbore, while at the same time cause less formation damage (i.e., a fluid that does not impede the permeability of the formation).

In oil sand operation massive amount of sands are left after oil is stripped from the sand surface. Finding a more cost efficient way to transport sands efficiently over distance through pipelines has long been required in the industry.

U.S. Pat. Nos. 7,723,274 and 8,105,986 disclose a different way of enhancing particulate transportation using a slurry. Unlike the conventional way, which focuses on improving fluid rheology (as discussed above), these patents teach that by rendering the particulate surfaces sufficiently hydrophobic, gas bubbles become attached to the particulate surfaces, thus buoying the particulates, and consequently resulting in the formation of stable slurry without requiring viscosifying of the fluid. Moreover, the spontaneous attachment of bubbles to different particulates bridges the particulates together resulting in particulate agglomeration (aggregation). This is also known as gas bridging in the scientific literature. The slurry can be used to effectively transport particulates in different applications, particularly in hydraulic fracturing operation.

SUMMARY

It has been found that the addition of a hydrophobic polymer to a slurry composition, for example that disclosed in U.S. Pat. Nos. 7,723,274 and 8,105,986, can significantly enhance the attachment of bubbles to the particulate surfaces and can enhance particulate agglomeration. Consequently the transportation capability of the slurry is improved.

According to one aspect there is provided an aqueous slurry composition comprising an aqueous liquid, particulates, a hydrophobizing agent which renders the particulate surfaces hydrophobic and a hydrophobic polymer. Also provided is a method of making such an aqueous slurry composition. In some embodiments the aqueous slurry composition is a fracturing fluid. In some embodiments the particulates are proppants.

According to another aspect there is provided an aqueous slurry composition comprising an aqueous liquid, particulates, a hydrophobizing agent which renders the particulate surfaces hydrophobic, a hydrophobic polymer and a gas. Also provided is a method of making such an aqueous slurry composition. In some embodiments the aqueous slurry composition is a fracturing fluid. In some embodiments the particulates are proppants.

According to a further aspect there is provided an aqueous slurry composition comprising an aqueous liquid, particulates, a hydrophobizing agent which renders the particulate surfaces hydrophobic, a hydrophobic polymer and a frother. Also provided is a method of making such an aqueous slurry composition. In some embodiments the aqueous slurry composition is a fracturing fluid. In some embodiments the particulates are proppants.

According to a further aspect there is provided an aqueous slurry composition comprising an aqueous liquid, particulates, a hydrophobizing agent which renders the particulate surfaces hydrophobic, a hydrophobic polymer and an oil. Also provided is a method of making such an aqueous slurry composition. In some embodiments the aqueous slurry composition is a fracturing fluid. In some embodiments the particulates are proppants.

According to a further aspect there is provided a method of treating proppants in a hydraulic fracturing operation by contacting the proppants with a hydrophobizing agent which renders the particulate surfaces hydrophobic and a hydrophobic polymer, before or during the hydraulic fracturing operation.

According to a further aspect there is provided a method of treating proppants in a hydraulic fracturing operation by contacting the proppants with a hydrophobizing agent which renders the particulate surfaces hydrophobic, a hydrophobic polymer and a frother, before or during the hydraulic fracturing operation.

According to a further aspect, there is provided a method of treating proppants in a hydraulic fracturing operation by contacting the proppants with a hydrophobizing agent which renders the particulate surfaces hydrophobic, a hydrophobic polymer and an oil before or during such hydraulic fracturing operation. As well, when used in fracturing operations, especially slick water fracturing, water can be re-used after flowback from a previous fracturing operation, to make the slurry.

In one aspect, described herein is a well service slurry composition, including a fracturing fluid composition, comprising:
a) an aqueous liquid;
b) particulates;
c) one or more hydrophobizing agents; and
d) one or more hydrophobic polymers.

The one or more hydrophobic polymers may be a polyolefin, a styrene polymer, a vinyl polymer, an acrylic polymer, a polyester, or a fluorinated or silyl-modified derivative of a polyolefin, a styrene polymer, a vinyl polymer, an acrylic polymer or a polyester.

The one or more hydrophobizing agents may be an amine hydrophobizing agent, or a silicon or fluorinated hydrophobizing agent. In various embodiments the slurry composition may further comprise a frother, a gas, an oil, or a combination of these agents.

In one embodiment the slurry composition is a fracturing fluid and wherein the particulates are proppants. In one embodiment the particulates are sand proppants. In one embodiment the aqueous liquid is flowback water from a previous fracturing operation.

In another aspect, disclosed herein is a method of preparing an aqueous slurry composition, including a fracturing fluid composition, comprising the step of mixing an aqueous liquid, particulates, a hydrophobic polymer and a hydrophobizing agent together to form a mixture.

In one embodiment the method further comprises the step of mixing the particulates and the hydrophobizing agent together before adding the hydrophobic polymer to the mixture.

In one embodiment the hydrophobic polymer is a polyolefin, a styrene polymer, a vinyl polymer, an acrylic polymer, a polyester, or a fluorinated or silyl-modified derivative of a polyolefin, a styrene polymer, a vinyl polymer, an acrylic polymer or a polyester.

In one embodiment the hydrophobizing agent is an amine hydrophobizing agent. In one embodiment the hydrophobizing agent is a silicon or fluorinated hydrophobizing agent.

In one embodiment the method further comprises the step of adding a frother, an oil, a gas, or combination of same, to the mixture.

In one embodiment of the method the aqueous slurry composition is a fracturing fluid and wherein the particulates are proppants.

In one embodiment of the method, the fracturing fluid is formed simultaneously while it is being pumped into a formation. In one embodiment, the aqueous liquid is flowback water from a previous fracturing operation.

In another aspect, described herein is a method of preparing a well service slurry composition, including a fracturing fluid composition, comprising the steps of:
a) contacting particulates with a liquid medium containing a hydrophobizing agent and a hydrophobic polymer, to form treated particulates;
b) separating the treated particulates from the liquid medium; and
c) mixing the treated particulates with an aqueous liquid to form the aqueous slurry composition.

The liquid medium may be an aqueous or a non-aqueous medium.

The hydrophobic polymer may be a polyolefin, a styrene polymer, a vinyl polymer, an acrylic polymer, a polyester, or a fluorinated or silyl-modified derivative of a polyolefin, a styrene polymer, a vinyl polymer, an acrylic polymer or a polyester.

The hydrophobizing agent may be an amine hydrophobizing agent or a silicon or fluorinated hydrophobizing agent. The method may further comprise the step of adding a frother and/or a gas and/or an oil to the aqueous slurry composition.

In one embodiment of the method the aqueous slurry composition is a fracturing fluid and the particulates are proppants. In one embodiment of the method the aqueous liquid is flowback water from a previous fracturing operation.

In another aspect, described herein is method of preparing a well service slurry composition, including a fracturing fluid composition, comprising the steps of:
a) contacting particulates with a liquid medium containing a hydrophobizing agent to form treated particulates;
b) separating the treated particulates from the liquid medium; and
c) mixing the treated particulates with a hydrophobic polymer and an aqueous liquid to form the aqueous slurry composition.

The liquid medium may be an aqueous or a non-aqueous medium.

The hydrophobic polymer may be a polyolefin, a styrene polymer, a vinyl polymer, an acrylic polymer, a polyester, or a fluorinated or silyl-modified derivative of a polyolefin, a styrene polymer, a vinyl polymer, an acrylic polymer or a polyester.

The hydrophobizing agent may be an amine hydrophobizing agent or a silicon or fluorinated hydrophobizing agent. The method may further comprise the step of adding a frother and/or a gas and/or an oil to the aqueous slurry composition.

In one embodiment of the method the aqueous slurry composition is a fracturing fluid and the particulates are proppants. In one embodiment of the method the aqueous liquid is flowback water from a previous fracturing operation.

DETAILED DESCRIPTION

For purposes of this specification and the claims appended thereto, the term "hydrophobic polymer" is used herein to mean any polymer that is non-wetting to water and typically has a water contact angle approximately equal to or greater than 90°. Examples of hydrophobic polymers, by way of illustration only, include: (a) polyolefins, which is a class of polymers or copolymers synthesized from a simple olefin as a monomer including, polyethylene, poly(isobutene), poly(isoprene), poly(4-methyl-1-pentene), polypropylene, ethylene propylene copolymers, ethylene-propylene-hexadiene copolymers, and ethylene-vinyl acetate copolymers; (b) styrene polymers, including poly(styrene), poly(2-methylstyrene), styrene-acrylonitrile copolymers having less than about 20 mole-percent acrylonitrile; (c) vinyl polymers, such as poly(vinyl butyrate), poly(vinyl decanoate), poly(vinyl dodecanoate), poly(vinyl hexadecanoate), poly(vinyl hexanoate), poly(vinyl propionate), poly(vinyl octanoate), and poly(methacrylonitnile); (d) acrylic polymers, including poly(n-butyl acetate), poly(ethyl acrylate); methacrylic polymers, such as poly(benzyl methacrylate), poly(n-butyl methacrylate), poly(isobutyl methacrylate), poly(t-butyl methacrylate), poly(t-butylaminoethyl methacrylate), poly(dodecyl methacrylate), poly(ethyl methacrylate), poly(2-ethylhexyl methacrylate), poly(n-hexyl methacrylate), poly(phenyl methacrylate), poly(n-propyl methacrylate), poly(octadecyl methacrylate); (e) polyesters, such as poly(ethylene terephthalate), poly(butylene terephthalate), and poly(ethylene terenaphthalate); and (f) fluorinated or silyl-modified derivatives of above mentioned polymers, such as silyl-modified polyolefines, silyl-modified polyacrylates, silyl-modified polyamides, fluorinated olefin polymers, fluorinated vinyl polymers, fluorinated styrene polymers, fluorinated acrylic polymers, and fluorinated methacrylic polymers are included as well, including poly(chlorotrifluoroethylene), chlorotrifluoroethylenetetrafluoroethylene copolymers, poly(hexafluoropropylene), poly(tetrafluoroethylene), tetrafluoroethylene-ethylene copolymers, poly(trifluoroethylene), and styrene-2,2,3,3,-tetrafluoropropyl methacrylate copolymers, poly(vinyl fluoride), poly(vinylidene fluoride); poly(heptafluoroisopropoxyethylene), poly(heptafluoroisopropoxypropylene), poly[(1-chlorodifluorornethyl) tetrafluoroethyl acrylate], poly[di(chlorofluoromethyl) fluoromethyl acrylate], poly(1,1-dihydroheptafluorobutylacrylate), poly(1,1-dihydropentafluoroisopropyl acrylate), poly(1.1-dihydropentadecafluorooctyl acrylate), poly(heptafluoroisopropyl acrylate), poly[5-(heptafluoroisopropoxy)pentyl acrylate], poly[11-(heptafluoroisopropoxy)undecyl acrylate], poly[2-(heptafluoropropoxy)ethyl acrylate], poly(nonafluoroisobutyl acrylate); poly(1,1-dihydropentadecafluorooctyl methacrylate), poly(heptafluoroisopropyl methacrylate), poly(heptadecafluorooctyl methacrylate), poly(1-hydrotetrafluoroethyl methacrylate), poly(1,1-dihydrotetrafluoropropyl methacrylate), poly(1-hydrohexafluoroisopropyl methacrylate), and poly(t-nonafluorobutyl methacrylate). Normally hydrophobic polymers of low or moderate molecular weights are preferred. Furthermore, hydrophobic polymers that are liquid or viscous liquid at moderate conditions are also preferred.

The hydrophobizing agent used herein includes amine hydrophobizing agents and silicon or fluorinated hydrophobizing agents. The term "amine hydrophobizing agent" is used herein to mean long carbon chain hydrocarbon amines (i.e., containing no silicon or fluoro-based groups in the molecules). Such compounds contain at least fourteen, preferably at least sixteen, carbon atoms, which render the surface of the particulates hydrophobic. These include simple primary, secondary and tertiary amines, primary ether amines, di-amines, polyamines, ether diamines, stearyl amines, tallow amines, condensates of amine or alkanolamine with fatty acid or fatty acid ester, and condensates of hydroxyethylendiamines. Examples include the condensate of diethylenetetraamine and tallow oil fatty acid, tetradecyloxypropyl amine, octadecyloxypropyl amine, hexadecyloxypropyl amine, hexadecyl-1,3-propanediamine, tallow-1,3-propanediamine, hexadecyl amine, tallow amine, soyaalkylamine, erucyl amine, hydrogenated erucyl amine, ethoxylated erucyl amine, rapeseed amine, hydrogenated rapeseed amine, ethoxylated rapeseed amine, ethoxylated oleylamine, hydrogenated oleylamine, ethoxylated hexadecyl amine, octadecylamine, ethoxylated octadecylamine, ditallowamine, hydrogenated soyaalkylamine, amine, hydrogenated tallow amine, di-octadecylamine, ethoxylated (2) tallowalkylamine, for example Ethomeen® T/12 or ethoxylated (2) soyaalkylamine, for example, Ethomeen® S/12, or oleyl amine, for example, Armeen® OL, or di-cocoalkylalamine, for example Armeen® 2C from Akzo Nobel Inc., and the condensate of an excess of fatty acids with diethanolamine.

The term "silicon or fluorinated hydrophobizing agents" is used herein to mean the hydrophobizing agents disclosed, for example, in U.S. Pat. No. 7,723,274, which include different organosilanes, organosiloxanes and polysiloxanes modified with different functional groups, including cationic, amphoteric as well as anionic groups, fluorinated silanes, fluorinated siloxanes and fluorinated hydrocarbon compounds. In general, organosilanes are compounds containing silicon to carbon bonds. Organosiloxanes are compounds containing Si—O—Si bonds. Polysiloxanes are compounds in which the elements silicon and oxygen alternate in the molecular skeleton, i.e., Si—O—Si bonds are repeated. The simplest polysiloxanes are polydimethylsiloxanes. Polysiloxane compounds can be modified by various organic substitutes having different numbers of carbons, which may contain N, S, or P moieties that impart desired characteristics. For example, cationic polysiloxanes are compounds in which one or more organic cationic groups are attached to the polysiloxane chain, either at the middle or the end or both at the same time. The most common organic cationic groups are organic amine derivatives including primary, secondary, tertiary and quaternary amines (for example, quaternary polysiloxanes including, quaternary polysiloxanes including mono- as well as di-quaternary polysiloxanes, amido quaternary polysiloxanes, imidazoline quaternary polysiloxanes and carboxy quaternary polysiloxanes). Similarly, the polysiloxane can be modified by organic amphoteric groups, where one or more organic amphoteric groups are attached to the polysiloxane chain, either at the middle or the end or both, and include betaine polysiloxanes and phosphobetaine polysiloxanes. Among different organosiloxane compounds which are useful for the present compositions and methods are polysiloxanes modified with organic amphoteric or cationic groups including organic betaine polysiloxanes and organic amino or quaternary polysiloxanes as examples. One type of betaine polysiloxane or quaternary polysiloxane is represented by the formula

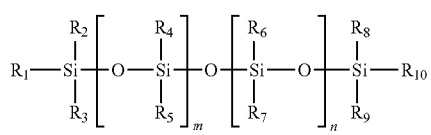

(II)

wherein each of the groups $R_1$ to $R_6$, and $R_8$ to $R_{10}$ represents an alkyl containing 1-6 carbon atoms, typically a methyl group, $R_7$ represents an organic betaine group for betaine polysiloxane, or an organic quaternary group for quaternary polysiloxane, and have different numbers of carbon atoms, and may contain a hydroxyl group or other functional groups containing N, P or S, and m and n are from 1 to 200. For example, in one type of quaternary polysiloxane $R^7$ is represented by the group

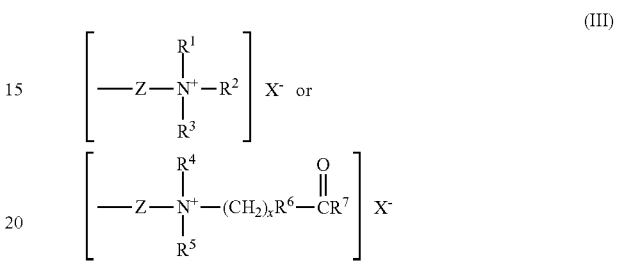

(III)

wherein $R^1$, $R^2$, $R^3$ are alkyl groups with 1 to 22 carbon atoms or alkenyl groups with 2 to 22 carbon atoms. $R^4$, $R^5$, $R^7$ are alkyl groups with 1 to 22 carbon atoms or alkenyl groups with 2 to 22 carbon atoms; $R^6$ is —O— or the $NR^8$ group, $R^8$ being an alkyl or hydroxyalkyl group with 1 to 4 carbon atoms or a hydrogen group; Z is a bivalent hydrocarbon group, which may have a hydroxyl group and may be interrupted by an oxygen atom, an amino group or an amide group; x is 2 to 4; The $R^1$, $R^2$, $R^3$, $R^4$, $R^5$, $R^7$ may be the same or different, and $X^-$ is an inorganic or organic anion including $Cl^-$ and $CH_3COO^-$. Examples of organic quaternary groups include [R—$N^+(CH_3)_2$—$CH_2CH(OH)CH_2$—O—$(CH_2)_3$—] ($CH_3COO^-$), wherein R is an alkyl group containing from 1-22 carbons or a benzyl radical and $CH_3COO^-$ an anion. Examples of organic betaine groups include —$(CH_2)_3$—O—$CH_2CH(OH)(CH_2)$—$N^+$ $(CH_3)_2CH_2COO^-$. Such compounds are commercially available. It should be understood that cationic polysiloxanes include compounds represented by formula (II), wherein $R_7$ represents other organic amine derivatives including organic primary, secondary and tertiary amines.

Other examples of organo-modified polysiloxanes include di-betaine polysiloxanes and di-quaternary polysiloxanes, which can be represented by the formula

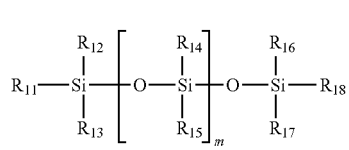

(IV)

wherein the groups $R_{12}$ to $R_{17}$ each represent an alkyl containing 1-6 carbon atoms, typically a methyl group, the $R_{11}$ and $R_{18}$ groups represent an organic betaine group for di-betaine polysiloxanes or an organic quaternary group for di-quaternary, and have different numbers of carbon atoms and may contain a hydroxyl group or other functional groups containing N, P or S, and m is from 1 to 200. For example, in one type of di-quaternary polysiloxane $R_{11}$ and $R_{18}$ are represented by the group

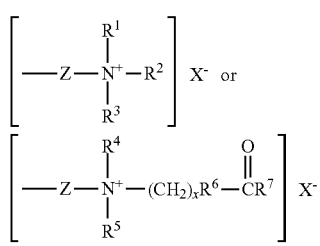

(V)

wherein $R^1$, $R^2$, $R^3$, $R^4$, $R^5$, $R^6$, $R^7$, Z, $X^-$ and x are the same as defined above. Such compounds are commercially available. Quaternium 80 (INCI) is one of the commercial examples.

Similarly, the polysiloxane can be modified by organic anionic groups, where one or more organic anionic groups are attached to the polysiloxane chain, either at the middle or the end or both, including sulfate polysiloxanes, phosphate polysiloxanes, carboxylate polysiloxanes, sulfonate polysiloxanes, thiosulfate polysiloxanes. The organosiloxane compounds also include alkylsiloxanes including hexamethylcyclotrisiloxane, octamethylcyclotetrasiloxane, decamethylcyclopentasiloxane, hexamethyldisiloxane, hexaethyldisiloxane, 1,3-divinyl-1,1,3,3-tetramethyldisiloxane, octamethyltrisiloxane, decamethyltetrasiloxane. The organosilane compounds include alkylchlorosilane, for example methyltrichlorosilane, dimethyldichlorosilane, trimethylchlorosilane, octadecyltrichlorosilane; alkyl-alkoxysilane compounds, for example methyl-, propyl-, isobutyl- and octyltrialkoxysilanes, and fluoro-organosilane compounds, for example 2-(n-perfluoro-octyl)-ethyltriethoxysilane, and perfluoro-octyldimethyl chlorosilane. Other types of chemical compounds, which are not organosilicon compounds, which can be used to render proppant surfaces hydrophobic are certain fluoro-substituted compounds, for example certain fluoro-organic compounds including cationic fluoro-organic compounds. Further information regarding organosilicon compounds can be found in U.S. Pat. No. 7,723,274 and Silicone Surfactants (Randal M. Hill, 1999) and the references therein, and in U.S. Pat. Nos. 4,046,795; 4,537,595; 4,564,456; 4,689,085; 4,960,845; 5,098,979; 5,149,765; 5,209,775; 5,240,760; 5,256,805; 5,359,104; 6,132,638 and 6,830,811 and Canadian Patent No. 2,213,168. Organosilanes can be represented by the formula $$R_nSiX_{(4-n)} \quad (I)$$

wherein R is an organic radical having 1-50 carbon atoms that may possess functionality containing N, S, or P moieties that impart desired characteristics, X is a halogen, alkoxy, acyloxy or amine and n has a value of 1-3. Examples of suitable organosilanes include:
$Si(OCH_3)_4$, $CH_3Si(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_3$, $C_6H_5CH_2Si(OCH_3)_3$, $C_6H_5Si(OCH_2CH_3)_3$, $CH_2\!\!=\!\!CHCH_2Si(OCH_3)_3$, $(CH_3)_2Si(OCH_3)_2$, $(CH_2\!\!=\!\!CH)Si(CH_3)_2Cl$, $(CH_3)_2Si(OCH_2CH_3)_2$, $(CH_3)_2Si(OCH_2CH_2CH_3)_2$, $(CH_3)_2Si[O(CH_2)_3CH_3]_2$, $(CH_3CH_2)_2Si(OCH_2CH_3)_2$, $(C_6H_5)_2Si(OCH_3)_2$, $(C_6H_5CH_2)_2Si(OCH_3)_2$, $(C_6H_5)_2Si(OCH_2CH_3)_2$, $(CH_2\!\!=\!\!CH)Si(OCH_3)_2$, $(CH_2\!\!=\!\!CHCH_2)_2Si(OCH_3)_2$, $(CH_3)_3SiOCH_3$, $CH_3HSi(OCH_3)_2$, $(CH_3)_2HSi(OCH_3)$, $CH_3Si(OCH_2CH_2CH_3)_3$, $CH_2\!\!=\!\!CHCH_2Si(OCH_2CH_2OCH_3)_3$, $(C_6H_5)_2Si(OCH_2CH_2OCH_3)_2$, $(CH_3)_2Si(OCH_2CH_2OCH_3)_2$, $(CH_2\!\!=\!\!CH_2)_2Si(OCH_2CH_2OCH_3)_2$, $(CH_2\!\!=\!\!CHCH_2)_2Si(OCH_2CH_2OCH_3)_2$, $(C_6H_5)_2Si(OCH_2CH_2OCH_3)_2$, $CH_3Si(CH_3COO)_3$, 3-aminotriethoxysilane, methyldiethylchlorosilane, butyltrichlorosilane, diphenyldichlorosilane, vinyltrichlorosilane, methyltrimethoxysilane, vinyltriethoxysilane, vinyltris(methoxyethoxy) silane, methacryloxypropyltrimethoxysilane, glycidoxypropyltrimethoxysilane, aminopropyltriethoxysilane, divinyldi-2-methoxysilane, ethyltributoxysilane, isobutyltrimethoxysilane, hexyltrimethoxysilane, n-octyltriethoxysilane, dihexyldimethoxysilane, octadecyltrichlorosilane, octadecyltrimethoxysilane, octadecyldimethylchlorosilane, octadecyldimethylmethoxysilane and quaternary ammonium silanes including 3-(trimethoxysilyl)propyldimethyloctadecyl ammonium chloride, 3-(trimethoxysilyl)propyldimethyloctadecyl ammonium bromide, 3-(trimethylethoxysilylpropyl)didecylmethyl ammonium chloride, triethoxysilyl soyapropyl dimonium chloride, 3-(trimethylethoxysilylpropyl)didecylmethyl ammonium bromide, 3-(trimethylethoxysilylpropyl)didecylmethyl ammonium bromide, triethoxysilyl soyapropyl dimonium bromide, $(CH_3O)_3Si(CH_2)_3P^+(C_6H_5)_3Cl^-$, $(CH_3O)_3Si(CH_2)_3P^+(C_6H_5)_3Br^-$, $(CH_3O)_3Si(CH_2)_3P^+(CH_3)_3Cl^-$, $(CH_3O)_3Si(CH_2)_3P^+(C_6H_{13})_3Cl^-$, $(CH_3O)_3Si(CH_2)_3N^+(CH_3)_2C_4H_9Cl^-$, $(CH_3O)_3Si(CH_2)_3N^+(CH_3)_2CH_2C_6H_5Cl^-$, $(CH_3O)_3Si(CH_2)_3N^+(CH_3)_2CH_2CH_2OHCl^-$, $(CH_3O)_3Si(CH_2)_3N^+(C_2H_5)_3Cl^-$, $(C_2H_5O)_3Si(CH_2)_3N^+(CH_3)_2C_{18}H_{37}Cl^-$. It is well known that some silanes, for example, alkoxy silanes, undergo hydrolysis in aqueous medium before reacting with hydroxyl groups (—OH) on the particulate surfaces, for example, sand surfaces.

The term "frother" is used herein to mean a compound that acts to stabilize bubbles so that they will remain well-dispersed in the slurry. The most commonly used frothers are aliphatic alcohols, including particularly, methyl isobutyl carbinol (MIBC), 2-ethyl hexanol, n-pentanol, n-butyl, n-hexanol, 2-butanol, n-heptanol, n-octanol, iso-amyl alcohol as well as cyclic alcohols including pine oil, terpineol, fenchyl alcohol, alkoxy paraffins such as 1, 1, 3,-triethoxybutane (TEB) and polypropyl glycol ethers such as commercial products Dowfroths® by Dow Chemicals Company. It is understood that mixtures of different frothers, such as mixtures of the alcohols, are often used. As well, oils including hydrocarbon oils such as mineral oils or paraffin oils and natural oils can be used alone or in combination with, for example, an alcohol frother, to stabilize the bubbles on the particulate surfaces and enhance particulate agglomeration.

The term "aqueous liquid" or "aqueous fluid" is used herein to mean water, salt solutions, or water containing an alcohol or other organic solvents. It should be understood that additives other than water in the aqueous liquid should be used in amounts or in a manner that does not adversely affect the methods and compositions described herein. The size of particulates in the compositions and methods described herein is about 10-100 U.S. mesh, which is about 150 to 2000 μm in diameter. It should be understood that the size distribution of the particulates, such as proppants, can be narrow or wide. Suitable proppants include sands, ceramic proppants, glass beads/spheres, bauxite proppants, synthetic particulates and any other proppants known in the industry.

The slurries described herein can be made on the surface or in situ in a subterranean formation. Furthermore, a gas can be mixed into the slurry. Suitable gases include air, carbon dioxide, nitrogen, methane and mixtures thereof. The gas can be introduced into the slurry during preparation thereof.

For example, when the slurry is pumped through a pipe, gas such as air or nitrogen can be introduced into the slurry.

The slurry compositions described herein, particularly those suitable for use in hydraulic fracturing operations, comprise an aqueous liquid, proppants, such as sands, one or more hydrophobizing agents as described herein (such as a stearyl amine, tallow amine, a cationic modified polysiloxane, an amine silane or an alkoxy silane), and one or more hydrophobic polymers (for example, a polyolefin such as poly(isobutene) or poly(isoprene)). The compositions may also include a frother such as MIBC or a small amount of oil, or a frother/oil combination. Furthermore, a gas such as air, nitrogen or carbon dioxide (or mixtures thereof) can also be added to the slurry compositions.

For hydraulic fracturing operations, the slurries can be prepared, for example on-the-fly, by mixing an aqueous liquid, proppants, such as sands, one or more hydrophobizing agents as described herein (such as a stearyl amine, tallow amine, a cationic modified polysiloxane, an amine silane or an alkoxy silane), and one or more hydrophobic polymers (for example, a polyolefin such as poly(isobutene) or poly(isoprene)) using conventional mixing methods under sufficient shear while pumping the slurry into the subterranean formation. Additionally, the slurries may further comprise a frother such as MIBC, or an oil, such as a mineral oil, or a frother/oil combination. Such frothers, oils or frother/oil combinations can be premixed with the hydrophobizing agent and hydrophobic polymer or can be added separately in the slurry to enhance the particulate floatation. Furthermore, a gas such as air, nitrogen or carbon dioxide (or mixtures thereof) can also be added to the slurry.

Alternatively, proppants can be pre-treated prior to being introduced into the fluid, wherein proppants are first treated by contacting the proppants with a liquid medium containing one or more hydrophobizing agents as described herein (such as a stearyl amine, a cationic modified polysiloxane, an amine silane or an alkoxy silane), one or more hydrophobic polymers, for example, a polyolefin (such as poly(isobutene) or poly(isoprene)), and then separating the treated proppants from the medium. The liquid medium used for pre-treating the proppants can be aqueous or non-aqueous. The pre-hydrophobized proppants, i.e., treated proppants, can later be mixed with an aqueous liquid containing a small amount of oil, such as mineral oil, to make the slurry during a hydraulic fracturing operation. Alternatively, the pre-treated proppants can later be mixed with an aqueous liquid containing a frother, such as MIBC, to make the slurry during a hydraulic fracturing operation. Finally, the pre-treated proppants can later be mixed with an aqueous liquid containing a frother/oil mixture. Furthermore, a gas such as air, nitrogen or carbon dioxide (or mixtures thereof) can also be added to the slurry.

In another embodiment, proppants can first be treated by contacting the proppants with a liquid medium containing one or more hydrophobizing agents as described herein, one or more hydrophobic polymers, and oil, and then separating the proppants from the medium. The pre-treated proppants can later be mixed with an aqueous liquid to make the slurry during a hydraulic fracturing operation. A frother can be added to the slurry composition while pumping. Furthermore, a gas such as air, nitrogen or carbon dioxide (or mixtures thereof) can also be added to the slurry.

In another embodiment, proppants can first be treated by contacting the proppants with a medium containing one or more hydrophobic polymers and then separating the proppants from the medium. The pre-treated proppants can later be mixed with an aqueous liquid containing one or more hydrophobizing agents as described herein and a small amount of oil, such as mineral oil, to make the slurry during a hydraulic fracturing operation. Alternatively, the pre-treated proppants can later be mixed with an aqueous liquid containing a frother, such as MIBC, to make the slurry during a hydraulic fracturing operation. Finally, the pre-treated proppants can later be mixed with an aqueous liquid containing a frother/oil mixture. Furthermore, a gas such as air, nitrogen or carbon dioxide (or mixtures thereof) can also be added to the slurry.

In a further embodiment, proppants can first be treated by contacting the proppants with a medium containing one or more hydrophobic polymers and oil and then separating the proppants from the medium. The pre-treated proppants can later be mixed with an aqueous liquid comprising one or more hydrophobizing agents as described herein to make the slurry during a hydraulic fracturing operation. A frother can also be added to the slurry composition. Furthermore, a gas such as air, nitrogen or carbon dioxide (or mixtures thereof) can also be added to the slurry.

In another embodiment, proppants can first be treated by contacting the proppants with a medium containing one or more hydrophobizing agents as described herein and then separating the proppants from the medium. The pre-treated proppants can later be mixed with an aqueous liquid comprising one or more hydrophobic polymers. This aqueous liquid may also comprise a small amount of oil, such as mineral oil, or a frother, such as MIBC, or a frother/oil mixture. Furthermore, a gas such as air, nitrogen or carbon dioxide (or mixtures thereof) can also be added to the slurry.

Normally, a frother such as MIBS or n-hexanol, or an oil, are added in a small amount, which is less than 2% and preferably less than 1% of the total fluid volume.

In another embodiment, proppants can be pre-treated on-the-fly in a fracturing operation wherein the proppants are pre-treated prior to being added to the blender while at the same time fluid is pumped into a well. There are a few methods of pre-treating on-the-fly. In one method, prior to being added into the blender, proppants are first treated by contacting the proppants (for example by spraying), with a liquid medium containing one or more hydrophobizing agents as described herein (such as tallow amine, a cationic modified polysiloxane, an amine silane or an alkoxy silane), one or more hydrophobic polymers (such as a polyolefin including poly(isobutene) and poly(isoprene)), and either an oil, or a frother or a frother/oil mixture. The pre-treated proppants are subsequently mixed with an aqueous liquid while being pumped into a well.

In an alternative embodiment, proppant can be first treated on-the-fly, for example by contacting the proppants (for example, by spraying), prior to being added to the blender, with a medium containing one or more hydrophobizing agents as described herein, and the pre-treated proppants are subsequently mixed with an aqueous liquid containing one or more hydrophobic polymers and either an oil, or a frother or a frother/oil mixture while being pumped into a well.

In another embodiment, the proppants can be pre-treated on-the-fly by contacting the proppants with a medium (for example by spraying), prior to adding into the blender, containing one or more hydrophobic polymers (for example, a polyolefin such as poly(isobutene)) and an oil (for example, mineral oil), and the pre-treated proppants are subsequently mixed with an aqueous liquid containing one or more hydrophobizing agents as described herein, while being pumped into a well. A frother can be added to the slurry composition while pumping.

In another embodiment, proppants are pre-treated by contacting the proppants (for example by spraying), prior to being added into the blender, with a medium containing one or more hydrophobizing agents as described herein (for example, an octadecylamine, a cationic modified polysiloxane, an amine silane or an alkoxy silane), and one or more hydrophobic polymers (for example, polyolefin including poly(isobutene) and poly(isoprene)), and subsequently mixing with an aqueous liquid containing either an oil, a frother or a frother/oil mixture while being pumped into a well.

In an another embodiment, proppant can be first treated on-the-fly, for example by contacting the proppants (for example, by spraying), prior to being added to the blender, with a medium containing one or more hydrophobic polymers and the pre-treated proppants are subsequently mixed with an aqueous liquid containing one or more hydrophobizing agents as described herein, and either an oil, or a frother or a frother/oil mixture while being pumped into a well.

Optionally, a gas such as air, nitrogen or carbon dioxide (or mixtures thereof) can also be added to the slurry compositions. Normally, a frother such as MIBS or n-hexanol, or an oil are added in a small amount, which is less than 2% and preferably less than 1% of the total fluid volume.

With all of the above-mentioned applications the hydrophobic polymers may, in some cases, be further chemically cross-linked with each other or with the hydrophobizing agent, normally in the presence of a catalyst, after they are attached to the surfaces of the particulates.

Various proppants known to the industry, including sands and ceramic proppants, can be treated according to the present disclosure during the manufacturing process, where the proppants are treated and then transported to the well site for the fracturing operations. In each case, a gas, such as air, nitrogen or carbon dioxide and mixtures thereof, can also be mixed into the slurry under agitation. As noted above, the slurry can be prepared on surface (above ground) or in a subterranean formation where proppants, an aqueous fluid, and a hydrophobizing agent are mixed in situ. With the composition described herein, a high concentration of proppants can easily be pumped into a formation and the proppants are more evenly distributed in the fracture, leading to improved proppant conductivity.

In each case water, especially slick water, where the fluid itself has very limited proppant transportation capability, is particularly preferred as the fracturing fluid. Linear gels of guar gum and its derivatives or polyacrylamide polymer or its copolymers including hydrophobically modified polyacrylamide can be used as well.

The amount of hydrophobizing agent, the hydrophobic polymer and oil used in the methods and compositions described herein depends to a large extent upon the type of particulates, the concentration of the particulates, as well as the fluid used. In general, more hydrophobizing agent and hydrophobic polymer and oil are required when particulates concentration is high.

Another benefit of the slurries described herein is that water in the slurry can be re-used, after it is separated from the proppants after a fracturing operation. The flowback water from a previous fracturing operation, especially fracturing operation using slick water, or mixture of flowback water and fresh water can be used in the compositions and methods described herein. This has great significance considering there is limited water supply in the world for hydraulic fracturing operations, especially in shale formations.

This disclosure also provides a method for preventing proppant flowback after a fracturing operation. Because of agglomeration, proppants in the slurry described herein tend to move cohesively, in contrast to conventional slurries under the same conditions. It is found that addition of oil, such as hydrocarbon oils, silicone oils, mineral oils, vegetable oils, or combinations thereof, to the slurry can significantly strengthen the proppant agglomeration. Proppant agglomeration makes it harder for fluid being flowed back to the surface (flowback fluid) to carry the proppants out of fractures, thus reducing proppant flowback. The strength of proppant agglomeration appears to depend on the contact angle formed between an oil drop and a proppant surface in water as well as on the solid/water interfacial tension. The strength of proppant agglomeration also appears to depend, to some extent, on the amount of oil used for the agglomeration.

The methods and compositions described herein are particularly useful in gravel-pack operations where sand slurry is normally pumped into a wellbore to prevent excessive amount of sands from flowing into the wellbore from the formation. The present method is cost effective.

Similarly, the methods and compositions described herein can also be used in so-called formation consolidation operations. In such an operation, a fluid containing, for example, a hydrophobizing agent as described herein, a hydrophobic polymer and oil, is injected into a formation to increase cohesiveness among sand grains to consolidate the formation and to reduce sand production.

In drilling operations, for example, a hydrophobizing agent, a hydrophobic polymer and an oil can be added into a water-based drilling fluid. It is particularly useful when the composition is added to water or brine for use as a drilling fluid. During a drilling operation, the fluid forms a slurry in situ with cuttings and transports the cuttings out of the wellbore. Furthermore, a gas such as nitrogen or carbon dioxide can be mixed with the slurry during drilling. Since it is not necessary to use polymers or clays to viscosify the fluid, there is much less formation damage. Moreover, the cuttings can be easily removed on the surface and the aqueous liquid becomes re-useable. Different formations including sandstone, carbonate, shale and coal seams can be drilled using the slurry described herein.

Similarly in wellbore cleanout operations, for example, water containing an amine hydrophobizing agent, a hydrophobic polymer, a frother and occasionally an oil can be circulated through the wellbore and form slurry with debris in situ. The debris is subsequently transported out of the wellbore. The fluid is re-useable after separation from the debris.

For transporting particulates through pipelines the slurry can be prepared by mixing an aqueous liquid, particulates and a hydrophobizing agent, a hydrophobic polymer, a frother and then pumping the slurry through the pipeline. Alternatively, a gas such as nitrogen can be included in the slurry as well.

The following are non-limiting examples of fluid compositions and methods embodying the principles described herein.

EXAMPLES

Sample A comprises of 59.5% of poly(isobutylene), 40% MIBC and 0.5% of stearylamine. The molecular weight of poly(isobutylene) is about 1,000.

Sample B comprises of 59.5% of poly(isobutylene), 40% MIBC and 0.5% of tallow amine TA-100. The molecular weight of poly(isobutylene) is about 1,000.

Sample C comprises of 59.5% of poly(isobutylene), 40% MIBC and 0.5% of ARMEEN® OL. The molecular weight of poly (isobutylene) is about 1,000.

Sample D comprises of 59.5% of poly(isobutylene), 40% 2-ethyl-1-hexanol and 0.5% of ETHOMEEN® S/12. The molecular weight of poly(isobutylene) is about 1,000.

Sample E comprises of 55.5% of poly(isoprene), 28% MIBC and 16% of limonene, and 0.5% of stearylamine.

Sample F comprises of 10% of polystyrene, 0.5% of stearylamine and 89.5% xylene.

Sample G comprises of 59.5% of poly[di(ethylene glycol) adipate], 0.5% of ARMEEN® OL and 40% 2-ethyl-1-hexanol. The molecular weight of poly[di(ethylene glycol) adipate] is ~2,500.

Sample H comprises of 10% of poly(isobutyl methacrylate), 0.5% of ARMEEN® OL and 89.5% xylene. The molecular weight of poly(isobutyl methacrylate) is ~70,000.

Sample I comprises of 10% of polyethylene, 0.5% of ARMEEN® OL and 89.5% xylene. The molecular weight of polyethylene is ~4,000.

Sample K comprises of 59.5% of poly(isobutylene) and 40.5% MIBC. The molecular weight of poly(isobutylene) is about 1,000.

Sample J comprises of 59.5% of poly(isobutylene), 40% MIBC and 0.5% of amine functionalized silicone polymer. The molecular weight of poly(isobutylene) is about 1,500.

Example 1

200 ml of water and 60 g of 20/40 mesh frac sand were added into a lab blender. Under moderate shear rate (5000 rpm), 4 ml of Sample A was added to the sand/water mixture in the blender. Then 0.2 ml of GFR-1, which is a polyacrylamide based friction reducing agent (about 30% active), was added to the blender. The slurry was sheared for about 15 seconds at 10,000 rpm. It was observed that about 60% of sand was floating on the top.

Example 2

0.3 ml of Sample A was mixed with 60 g of 20/40 frac sand. Then the mixture was added into a lab blender which contained 200 ml of water. The slurry was sheared for 15 seconds at a moderate rate, which is about 2500 rpm. It was observed that almost of sand was floating on the top.

Example 3

0.3 ml of Sample B was mixed with 60 g of 20/40 frac sand. Then the mixture was added into a lab blender which contained 200 ml of water. The slurry was sheared for 15 seconds at a moderate rate. It was observed that almost of sand was floating on the top.

Example 4

0.3 ml of Sample C was mixed with 60 g of 20/40 frac sand. Then the mixture was added into a lab blender which contained 200 ml of 0.1% GFR-1 aqueous solution. The slurry was sheared for 15 seconds at a moderate rate. It was observed that 50% of sand was floating on the top.

Example 5

0.3 ml of Sample D was mixed with 60 g of 40/70 frac sand. Then the mixture was added into a lab blender which contained 200 ml of water. The slurry was sheared for 15 seconds at a moderate rate. It was observed that 70% of sand was floating on the top.

Example 6

0.3 ml of Sample E was mixed with 60 g of 20/40 frac sand. Then the mixture was added into a lab blender which contained 200 ml of water. The slurry was sheared for 15 seconds at a moderate rate. It was observed that almost all of sand was floating on the top.

Example 7

0.3 ml of Sample F was mixed with 60 g of 20/40 frac sand. Then the mixture was added into a lab blender which contained 200 ml of water. The slurry was sheared for 15 seconds at a moderate rate. It was observed that around 50-60% of sand was floating on the top.

Example 8

0.3 ml of Sample G was mixed with 60 g of 20/40 frac sand. Then the mixture was added into a lab blender which contained 200 ml of 0.1% GFR-1 aqueous solution. The slurry was sheared for 15 seconds at a moderate rate. It was observed that around 50-60% of sand was floating on the top.

Comparative Example 8a

For comparison, Sample G' was prepared by replacing the hydrophobic polymer, poly[di(ethylene glycol) adipate], in Sample G with same amount of mineral oil while other components and concentrations remained the same, i.e., Sample G' comprises of 59.5% of Envirodrill® mineral oil, 0.5% of ARMEEN® OL and 40% 2-ethyl-1-hexanol. 0.3 ml of Sample G' was mixed with 60 g of 20/40 frac sand. Then the mixture was added into a lab blender which contained 200 ml of 0.1% GFR-1 aqueous solution. The slurry was sheared for 15 seconds at a moderate rate. It was observed that less than 10% of sand was floating on the top. This example demonstrates that, as compared to mineral oil, poly[di(ethylene glycol) adipate] is much more effective at promoting agglomeration.

Example 9

0.3 ml of Sample H was mixed with 60 g of 40/70 frac sand. Then the mixture was added into a lab blender which contained 200 ml of 0.1% GFR-1 aqueous solution. The slurry was shear for 15 seconds at a moderate rate. It was observed that around 50-60% of sand was floating on the top.

Example 10

0.3 ml of Sample I was mixed with 60 g of 40/70 frac sand. Then the mixture was added into a lab blender which contained 200 ml of 0.1% GFR-1 aqueous solution. The slurry was sheared for 15 seconds at a moderate rate. It was observed that around 40-50% of sand was floating on the top.

Example 11

0.3 ml of Sample J was mixed with 60 g of 20/40 frac sand. Then the mixture was added into a lab blender which contained 200 ml of 0.1% GFR-1 aqueous solution. The slurry was sheared for 15 seconds at a moderate rate. It was observed that around 70% of sand was floating on the top.

Example 11

0.3 ml of Sample J was mixed with 60 g of 20/40 frac sand. Then the mixture was added into a lab blender which contained 200 ml of 0.1% GFR-1 aqueous solution. The slurry was sheared for 15 seconds at a moderate rate. It was observed that around 70-80% of sand was floating on the top.

Comparative Example 11a

For comparison, Sample J' was prepared by replacing the hydrophobic polymer, poly(isobutylene), in Sample J with same amount of mineral oil while other components and concentrations remained the same, i.e., Sample J' comprises of 59% of Envirodrill® mineral oil, 40% MIBC and 1% of amine functionalized silicone polymer. 0.3 ml of Sample J' was mixed with 60 g of 20/40 frac sand. Then the mixture was added into a lab blender which contained 200 ml of 0.1% GFR-1 aqueous solution. The slurry was sheared for 15 seconds at a moderate rate. It was observed that around 30% of sand was floating on the top. This example demonstrates that, as compared to mineral oil, poly(isobutylene) is much more effective at promoting agglomeration.

Example 12

0.3 ml of Sample K was mixed with 60 g of 40/70 frac sand. Then the mixture was added into a lab blender which contained 200 ml of water. The slurry was sheared for 15 seconds at a moderate rate. It was observed that almost all of sand was settling on the bottom.

The invention claimed is:

1. A method of hydraulic fracturing of a formation, comprising:
   a) obtaining a coated sand proppant that is spray coated with a liquid medium comprising a mixture of a hydrophobizing agent and a hydrophobic polymer, wherein the hydrophobizing agent is a polysiloxane or an alkoxysilane and the hydrophobic polymer is a polyolefin; thereafter
   b) preparing a hydraulic fracturing slurry by blending together an aqueous liquid and the coated sand proppant coated with the hydrophobizing agent and the hydrophobic polymer; and thereafter
   c) pumping the hydraulic fracturing slurry into the formation.

2. The method of claim 1 wherein the spraying of the liquid medium is done on-the-fly at the site of the well, and the coated sand proppant is thereafter added to the aqueous liquid in a blender.

3. The method of claim 1, further comprising the step of adding a gas to the hydraulic fracturing slurry before the pumping of the slurry into the well.

4. The method of claim 2, further comprising the step of adding a gas to the hydraulic fracturing slurry before the pumping of the slurry into the well.

5. The method of claim 3, wherein the gas is nitrogen or carbon dioxide.

6. The method of claim 4, wherein the gas is nitrogen or carbon dioxide.

7. The method of claim 1, wherein the polyolefin is a polyisobutene, or an ethylene-vinyl acetate copolymer or mixtures thereof.

8. The method of claim 1 wherein the polyolefin is a polyisobutene.

9. The method of claim 1, wherein the polyolefin is an ethylene-vinyl acetate copolymer.

10. The method of claim 1 wherein the hydrophobizing agent is an alkoxysilane.

11. The method of claim 1, wherein the hydrophobizing agent is a polysiloxane.

12. The method of claim 11, wherein the polysiloxane is a cationic or an amphoteric polysiloxane.

13. The method of claim 11, wherein the polysiloxane is a cationic polysiloxane.

14. The method of claim 7, wherein the hydrophobizing agent is an alkoxysilane.

15. The method of claim 7, wherein the hydrophobizing agent is a polysiloxane.

16. The method of claim 15, wherein the polysiloxane is a cationic or an amphoteric polysiloxane.

17. The method of claim 15, wherein the polysiloxane is a cationic polysiloxane.

18. The method of claim 8, wherein the hydrophobizing agents is an alkoxysilane.

19. The method of claim 8, wherein the hydrophobizing agent is a polysiloxane.

20. The method of claim 19, wherein the polysiloxane is a cationic or an amphoteric polysiloxane.

21. The method of claim 19, wherein the polysiloxane is a cationic polysiloxane.

22. The method of claim 9, wherein the hydrophobizing agent an alkoxysilane.

23. The method of claim 9, wherein the hydrophobizing agent is a polysiloxane.

24. The method of claim 23, wherein the polysiloxane is a cationic or an amphoteric polysiloxane.

25. The method of claim 23, wherein the polysiloxane is a cationic polysiloxane.

26. The method of claim 2, wherein the polysiloxane is a cationic polysiloxane and the polyolefin is an ethylene-vinyl acetate copolymer.

27. The method of claim 26, further comprising the step of adding a gas to the hydraulic fracturing slurry before the pumping of the slurry into the well.

28. The method of claim 27, wherein the gas is nitrogen or carbon dioxide.

29. The method of claim 1, further comprising the step of adding a gas to the hydraulic fracturing slurry before the pumping of the slurry into the well.

30. The method of claim 29, wherein the gas is nitrogen or carbon dioxide.

31. The method of claim 1 wherein the aqueous liquid further comprises a friction reducing agent.

32. The method of claim 31 wherein the friction reducing agent is polyacrylamide or a derivative thereof at a concentration between 0.015 wt. % to 0.06 wt. % of the aqueous liquid.

33. The method of claim 1 wherein the coating of the sand proppants is by spraying the liquid medium comprising the hydrophobizing agent and the hydrophobic polymer and further comprising an oil, onto the sand proppants.

34. The method of claim 21, wherein the cationic polysiloxane comprises a cationic group that is a primary amine.

35. The method of claim 25, wherein the cationic polysiloxane comprises a cationic group that is a primary amine.

36. The method of claim 2, wherein the hydrophobizing agent is an alkoxysilane and the hydrophobic polymer is a polyolefin.

37. The method of claim 2, wherein the hydrophobizing agent is an alkoxysilane and the hydrophobic polymer is a polyisobutylene or an ethylene-vinyl acetate copolymer.

38. The method of claim 2 wherein the hydrophobizing agent is a cationic polysiloxane and the hydrophobic polymer is a polyolefin.

39. The method of claim 2 wherein the hydrophobizing agent is a cationic polysiloxane and the hydrophobic polymer is a polyisobutylene or an ethylene-vinyl acetate copolymer.

40. The method of claim 2 wherein the hydrophobizing agent is a cationic polysiloxane containing a cationic group that is a primary amine and the hydrophobic polymer is an ethylene-vinyl acetate copolymer.

41. The method of claim 2 wherein the hydrophobizing agent is a cationic polysiloxane containing a cationic group that is a primary amine and the hydrophobic polymer is an ethylene-vinyl acetate copolymer and the liquid medium is aqueous.

* * * * *